United States Patent
Ichino

(10) Patent No.: US 9,126,532 B2
(45) Date of Patent: Sep. 8, 2015

(54) DRIVING INTENTION INDICATOR DEVICES FOR CARS

(71) Applicant: Heiho Ichino, Kani (JP)

(72) Inventor: Heiho Ichino, Kani (JP)

( * ) Notice: Subject to any disclaimer, the term of this patent is extended or adjusted under 35 U.S.C. 154(b) by 121 days.

(21) Appl. No.: 14/152,735

(22) Filed: Jan. 10, 2014

(65) Prior Publication Data

US 2015/0197188 A1    Jul. 16, 2015

(51) Int. Cl.
*B60Q 1/50* (2006.01)
*B60Q 1/54* (2006.01)

(52) U.S. Cl.
CPC ........................ *B60Q 1/54* (2013.01)

(58) Field of Classification Search
CPC .................. B60Q 1/54; B60Q 1/343
USPC .......... 340/463, 464, 468, 480, 489; 362/464, 362/487, 540, 543
See application file for complete search history.

(56) References Cited

U.S. PATENT DOCUMENTS

| 3,492,638 | A | * | 1/1970 | Lane | 340/464 |
| 4,191,939 | A | * | 3/1980 | Bauman | 340/468 |
| 6,335,681 | B1 | | 1/2002 | Ontiveros et al. | |
| 6,693,526 | B1 | * | 2/2004 | Puccio | 340/479 |
| 6,952,162 | B2 | * | 10/2005 | Monck et al. | 340/464 |
| 2007/0109113 | A1 | * | 5/2007 | Owen | 340/464 |
| 2014/0070937 | A1 | * | 3/2014 | Anderson et al. | 340/464 |
| 2014/0266665 | A1 | * | 9/2014 | Haushalter | 340/464 |

FOREIGN PATENT DOCUMENTS

| GB | 1 333 884 A | 10/1973 |
| JP | 07-102596 A | 4/1995 |
| JP | 2006-298358 A | 11/2006 |
| JP | 2012-067478 A | 4/2012 |
| WO | WO 93/09974 A1 | 5/1993 |
| WO | WO 2007/025359 A1 | 3/2007 |

* cited by examiner

*Primary Examiner* — Daniel Wu
(74) *Attorney, Agent, or Firm* — Christensen Fonder P.A.

(57) ABSTRACT

Embodiments of the present invention may include a driving intention indictor device for a car. The indictor device preferably has right, middle and left indicator lamps and a switch. The right indicator lamp is provided on a right side of a car body in the width direction. The middle indicator lamp is provided at a central position of the car body. The left indicator lamp is provided on a left side of the car body. The position of the switch is selected by a driver in correspondence with switching between an express state in which the car always travels at a "saturation speed", a slow state in which the car travels at "mixed speed", and a motionless state in which the car is in a "motionless".

8 Claims, 4 Drawing Sheets

DRIVING INTENTION INDICATOR DEVICES FOR CARS

BACKGROUND OF THE INVENTION

1. Field of the Invention

Embodiments of the present invention relate to indicator devices for cars. The indicator devices convey a driver's intention to drivers of surrounding cars.

2. Description of the Related Art

Japanese Laid-Open Patent Publication No. 2006-298358 and Japanese Laid-Open Patent Publication No. 7-102596 disclose a construction machine. The construction machine has an indicator for indicating a moving direction and the turning direction thereof to people around the same. Japanese Laid-Open Patent Publication No. 2012-67478 discloses an indicator. The indicator indicates the condition of an electric power source switch to the surrounding people. It indicates whether or not an engine is to be started, a condition of a gate lock lever, etc.

There are speed limits under which a car must be operated for safe travel. There are also posted legal speed limits under which cars must travel. It is possible to go beyond such limited speeds as described below. Depending on certain circumstances, a permissible speed for traveling safely may be limited to the limited speed. The circumstances could be a traffic jam, weather-like condition such as rain or fog, a stop sign or signal, the existence of a pedestrian crossing the road, road construction and so on. The limited speed for the car to travel safely under the law will be referred to as a "permissible speed". The maximum permissible speed will be referred to as a "saturation speed."

The car may travel at the "saturation speed" for a period of time. When a driver is in a hurry, the driver typically has the intention of maintaining the "saturation speed." The car may travel at a "non-saturation speed." For example, when a driver requires safer driving, the driver drives at a speed lower than the "saturation speed." The car may travel at a "mixed speed." For example, the "saturation speed" differs from place to place. When the "saturation speed" is high, the car may travel at a "non-saturation speed," and when the "saturation speed" is low, the car may travel at the "saturation speed." As a result, even when the "saturation speed" is varied, the driver may sufficiently drive safely. When the car is at rest waiting for a traffic signal to turn green, the "saturation speed" is zero. Thus, even when the car travels while maintaining the "saturation speed," the speed may become zero. This will be referred to as "heteronomous stop."

A car may be in a "motionless" state. The "motionless" state includes an "autonomous stop" or a parked state. In the case of "autonomous stop," the actual speed is zero while the "saturation speed" is not zero.

SUMMARY OF THE INVENTION

According to an aspect of the invention, certain embodiments of the present invention include an indication device. The indication device has first, second, and third indicator lamps, and a switch. The first indicator lamp indicates a state in which a driver has an intention to always drive a car at a "saturation" speed. The second indicator-lamp indicates a state in which the driver has the intention to drive the car at a "mixed speed." The third indicator lamp indicates a state in which the driver has an intention to pace the car in a "motionless" state. The switch is operated by the driver. Through the operation of the switches, one of the first, second, and third indicator lamps is illuminated.

Regulations may indicate that the car should travel on a right of the road. In such cases, it is desirable to light the indicator lamp situated on the right in an "express" mode. In the "express" mode, the driver has an intention to always drive the car at the "saturation speed". In the "slow" mode, it is desirable to light the indicator lamp situated at the center. In the "slow" mode, the driver has an intention to drive the car at the "mixed speed". In a "motionless mode," it is desirable to light the indicator lamp situated on the left.

If, during low-speed traveling, the right indicator lamp is on, the driver of a rearward car can notice that the "saturation speed" is low. This helps the driver of rearward car to realize that a potentially dangerous lane change would be meaningless. When the central indicator lamp is on, the driver of the rearward car can recognize the necessity of a lane change. When the forward car is at rest, and the right indicator lamp is on, it is to be understood that the "saturation speed" is zero (heteronomous stop). If the left indicator lamp is on, it is to be recognized that a lane change is necessary.

DETAILED DESCRIPTION OF THE INVENTION

Each of the additional features and teachings disclosed above and below may be utilized separately or in conjunction with other features and teachings to provide improved indicator devices for cars. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
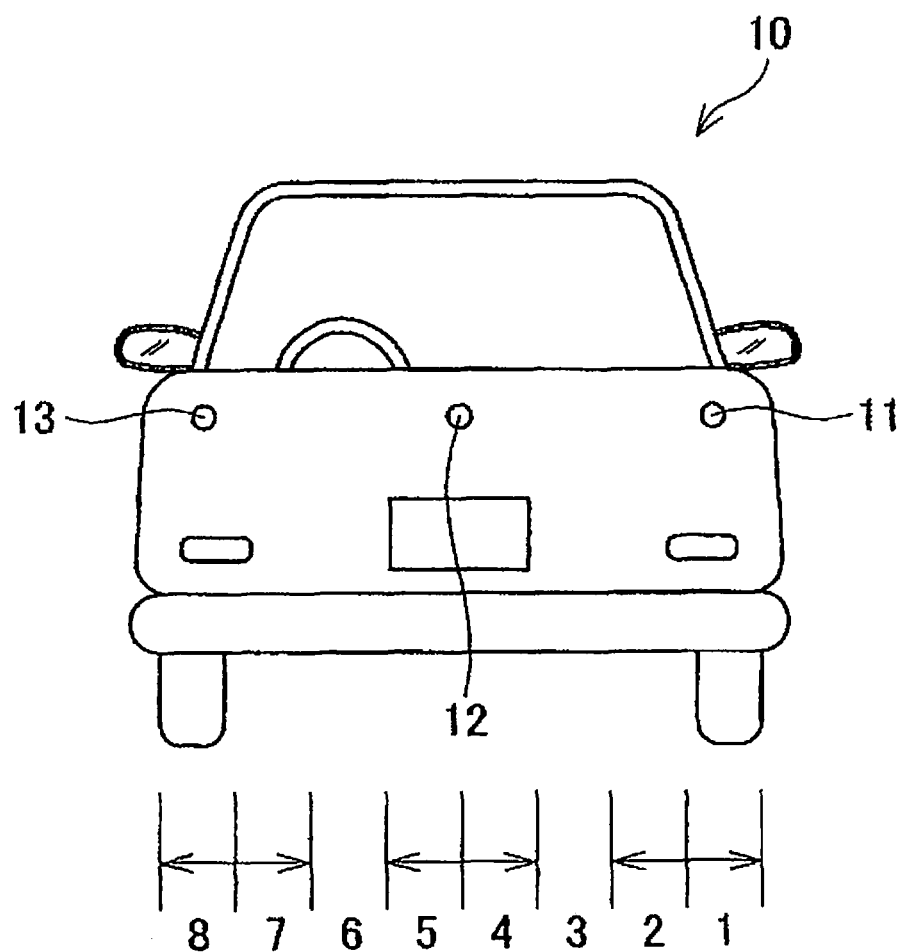
FIG. 1 is a rear view of a car having a right, left and center lamps that emanate the same color.
Figure 2:
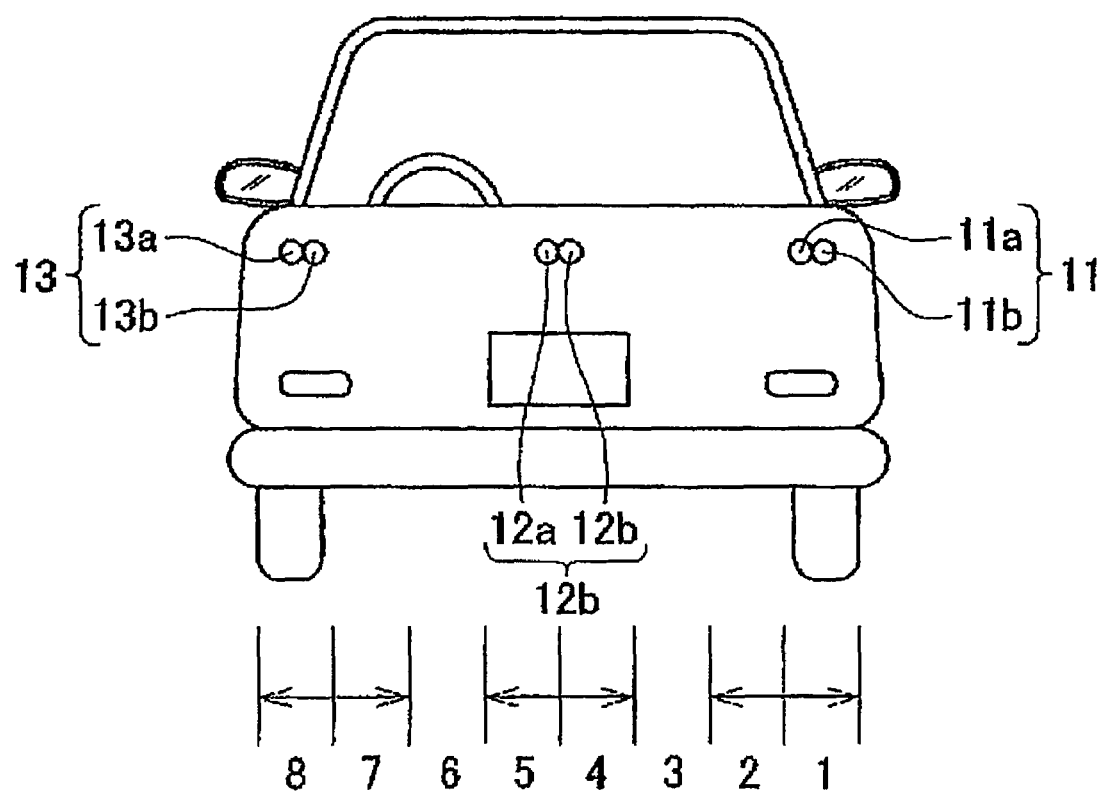
FIG. 2 is a rear view of a car having two right lamps, two left lamps and two center lamps those emanate the same color.

As shown in FIGS. 1 and 2, a car is equally divided in the width direction into eight sections. First to eighth sections are arranged from right to left as seen from the rear. A right indicator lamp 11 is situated in the first and/or second sections. A central indicator lamp 12 is situated in the fourth and/or fifth sections, and a left indicator lamp 13 is situated in the seventh and/or eighth sections. As shown in FIG. 1, the right, central, and left indicator lamps may have lamps that emit the same light. As shown in FIG. 2, each of the right, central, and left indicator lamps may have a plurality of light emitting lamps (11a and 11b; 12a and 12b; and 13a and 13b).

Figure 3:
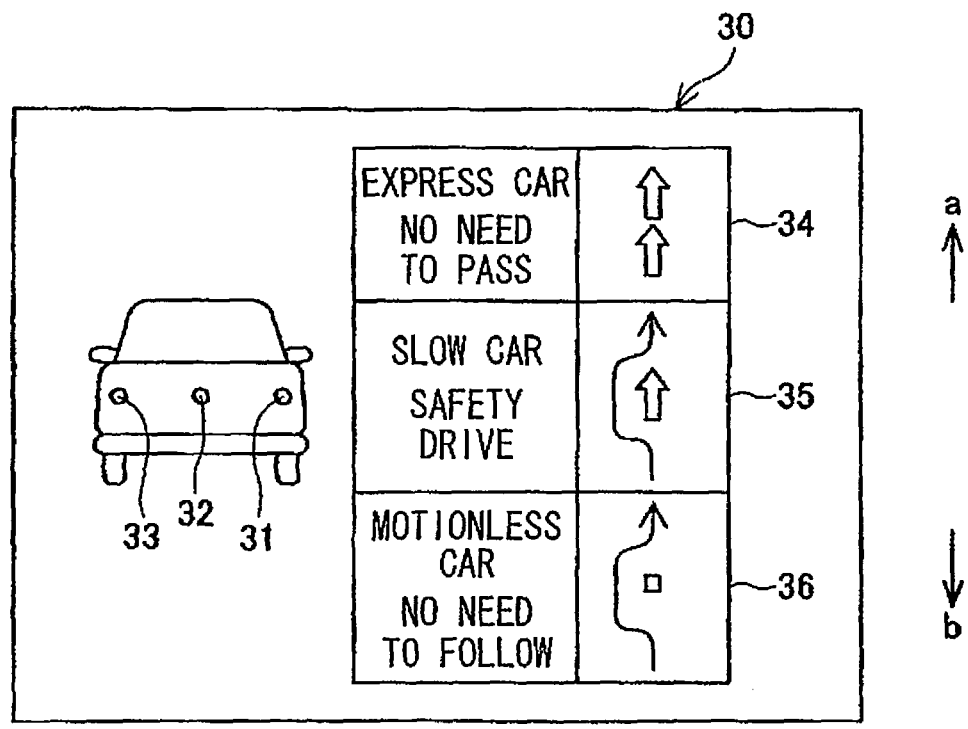
FIG. 3 is a front view of an indicator provided in front of a driver's seat.

An indicator 30 as shown in FIG. 3 may be installed near a driver's seat. While "express" is selected, a lamp 31 is illuminated. Preferably an inside area of a frame 34 is illuminated so as to be able to be visually recognized. While "slow" is selected, a lamp 32 is illuminated. Preferably an inside area of a frame 35 is illuminated so as to be able to be visually recognized. While "motionless" is selected, a lamp 33 is illuminated. Preferably an inside area of a frame 36 is illuminated so as to be able to be visually recognized.

Figure 4:
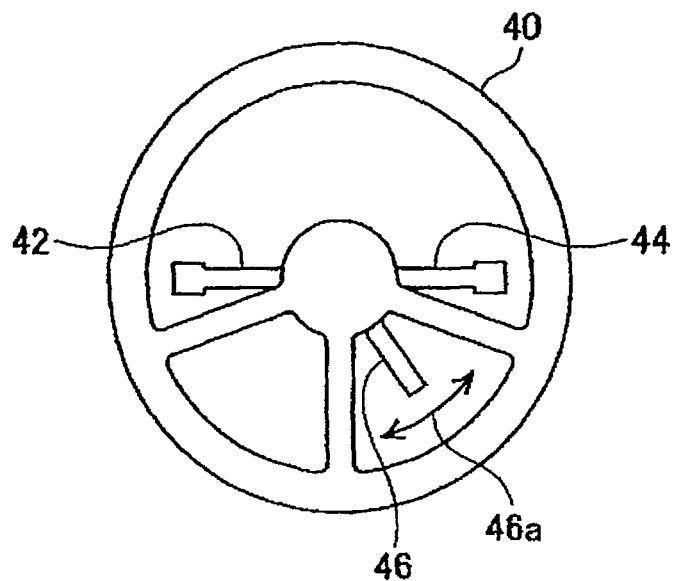
FIG. 4 is a front view of a steering wheel and levers operated by a driver.

As shown in FIG. 4, there is provided a switch (operation lever) 46 to be operated by the driver.

A driving intention indicator device (intention indicator) is provided on a rear surface of a car (automobile, vehicle) as defined by the Road Traffic Law (inclusive of a motorcycle). The driving intention indicator device has indicator lamps indicating "express car," "slow car," and "motionless car." When driving, the driver selects one of indicator lamps that matches his intention. The indicator lamp continuously remains on, or is illuminated at the time of traveling, stopping, or parking. By being illuminated, the indicator lamp indicates the intention of the driver to rearward cars or subsequent cars. Each indicator lamp emits a light of a specific color.

Due to this arrangement, it is possible to distinguish "special express, express, and slow" cars from each other as in the case of trains. The driving intention indicator device makes the driver's intention known to the drivers of the rearward cars. The drivers of the rearward cars can share the same intention or information with the driver of the forward car. Thus, it is possible for the driver of the rearward car to determine whether to follow or get ahead of the forward car. It is possible for the driver of the rearward car to eliminate any waste of time, and to efficiently continue law-abiding driving in conjunction with other cars while taking their time.

As shown in FIG. 2, the rear portion of a car is generally symmetrical with respect to a center line of the car. The two sections on the right constitute the right portion. The two sections on the left constitute the left portion. The two sections on both sides of the center line constitute the central portion. Two indicator lamps are provided at each of the right portion, the left portion, and the central portion. Alternatively, as shown in FIG. 1, one indicator lamp is provided at each of the three portions. Where the rule is to travel on the right side of the road, an "express" car lights the right indicator lamp. A "slow" car lights the central indicator lamp. A "motionless car" lights the left indicator lamp.

In a first system, all indicator lamps are illuminated in a green-type color. In a second system, the right indicator lamp, the central indicator lamp, and the left indicator lamp are all illuminated in different colors.

The driver effects switching of the indicator lamps according to his intention. In FIG. 4, reference numeral 40 indicates a steering wheel. Numeral 42 indicates a lever for a direction indicator, and numeral 44 indicates a lever for a windshield wiper. Numeral 46 indicates a selection switch.

The switch 46 can be operated in the direction of arrow 46a. In accordance with the position of the switch 46, selection is made from among "express car," "slow car," "no indication," and "motionless car." The switch 46 is provided at the driver's seat. The driver manually operates the switch 46. The switch 46 is of an alternative type, which does not allow two or more positions to be selected simultaneously.

As shown in FIG. 3, the indicator 30 is preferably installed at or near the driver's seat. The indicator 30 indicates the indicator lamp is selected. This helps the driver to check the indicator lamp selected. When the driver selects "express" by the selection switch 46, the lamp 31 and the frame 34 are illuminated. When "slow" is selected by the switch 46, the lamp 32 and the frame 35 are illuminated. When "motionless" is selected by the switch 46, the lamp 33 and the frame 36 are illuminated. When "no indication" is selected, the lamps 31 to 33 and the frames 34 to 36 are not illuminated. Apart from the indicator 30, it is also possible to provide a voice device for guiding the driver by voice. For example, when "express" is selected, an announcement "express car has been indicated" may be issued. When "slow" is selected, an announcement "slow car has been indicated" may be issued. When "motionless" is selected, an announcement "motionless car has been selected" may be issued. When "no indication" is selected, an announcement "no indication has been selected" may be issued.

The saturation speed means the maximum speed anyone is permitted to attain. For example, in the case of continuous use of a road, it is determined according to regulations of the Road Traffic Laws or instructions indicated by a police officer. Alternatively, it may be dictated by traffic conditions in order to prevent danger on the road and to attain safety and smoothness in traffic. Alternatively, it may be determined with respect to an external factor or factors not attributable to the car of the driver concerned.

A non-saturation speed refers to a speed slower than the "saturation speed." This does not include the parking state (which is the same as autonomous stop), where the traveling speed is 0 km/h. A mixed speed refers to a speed including non-saturation speed and saturation speed. A super-saturation speed refers to a speed in excess of the "saturation speed." A maximum saturation speed refers to a limited speed (designated speed/regulation speed) or a legal speed.

A complete saturation speed refers to the saturation speed of the "express car." The complete saturation speed is a speed obtained by adding an "addition speed constant" to the maximum saturation speed. The "addition speed constant" can be added on a straight paved road free from dangerous factors such as weather and uneven pavement. Such a road preferably has good visibility. The "addition speed constant" can be added under safe road conditions if it is added to the maximum saturation speed.

In a case where the legal speed for a general urban road is 50 km/h, the addition speed constant is, for example, 5 km/h, for a road where the regulation speed is not higher than 50 km/h. In the situation where a regulation speed is in excess of 50 km/h, the addition speed constant is, for example, 10 km/h.

Express refers to a state in which the car always travels at the "saturation speed". Slow refers to a state in which the car travels at a mixed speed.

Motionless refers to a state of "autonomous stop" or parking. "Autonomous stop" refers to a state in which while the "saturation speed" is not zero, the actual speed is zero. When the state of "autonomous stop" for loading and unloading exceeds five minutes, it is to be regarded as a parking state. If the driver, having been away from the car, cannot immediately start to drive, it is to be regarded as a parking state.

Heteronomous stop refers to a state in which the "saturation speed" is zero because the driver is waiting for the traffic light to change to green. "Minimum saturation speed" refers to a state in which the "saturation speed" is zero. Autonomous stop refers to a state in which the car is at rest although the "saturation speed" is not zero.

An express car is a car in the "express" state or immediately before the "express" state. The express car is a car in a state in which an indicator lamp thereof is at a predetermined position and a color is on. A slow car refers to a car in a "slow" movement, or in a state immediately before the "slow" state. A slow car is a car in a state in which an indicator lamp thereof is at a predetermined position and the color is on. On an expressway, the fixed limit speed may be 80 km/h. A motionless car refers to a car in a "motionless" state, or a car immediate before the "motionless" state. A motionless car is a car in a state in which an indicator lamp thereof is at a predetermined position and the color is on.

Model driving refers to driving in the "express" mode. Safe driving refers to driving in the "slow" mode.

A high-ranking car refers to a car on an expressway to which "maximum saturation speed" is imparted, e.g., an ordinary passenger car. A high-ranking express car is an express car of a high rank. A semi-high-ranking car refers to a "high-ranking car" on an expressway other than an ordinary passenger car. A semi-high-ranking car may alternatively refer to a car exhibiting a "maximum saturation speed" next to that of a "high-ranking car".

A coordinate car is a car exhibiting the same speed as the "maximum saturation speed". A coordinate express car is an express car coordinated in rank. A low-ranking car refers to a car on an expressway exhibiting a "maximum saturation speed" next to that of a semi-high-ranking car. Examples of a low-ranking car include a freight car of a total car weight of not less than a prescribed weight, and cars not belonging to the categories of "high-ranking car" and "semi-high-ranking car". A special express car is an "express car" consisting of an ordinary passenger car belonging to the category of "high-ranking car".

An "express car" travels while always maintaining a highest possible permissible speed, i.e., "saturation speed," with a predetermined indicator lamp on. The driver of a car is typically in a hurry is to follow the express forward car. When the express forward car decelerates, he also decelerates. When the express forward car stops, he also stops. When the express forward car accelerates, the subsequent car also accelerates quickly. On an ordinary urban road, an express car always travels at a highest possible permissible speed, i.e., "saturation speed". In "saturation speed" traveling, the speed may be reduced to 0 km/h (minimum saturation speed) at the time of stop at a red light, at the time of temporary stop, etc. Also, the speed may rise to the legal speed of 50 km/h (maximum saturation speed). At a given road condition, the "saturation speed" means the highest possible speed, or the maximum speed. There is only one highest possible speed permissible for an "express car": the "saturation speed". If the highest possible speed is exceeded, there is attained a "super-saturation speed". When the highest possible speed has not been attained yet, the car is at a "non-saturation speed". A "saturation speed" exists in accordance with road conditions. A low speed is not necessarily safe, and a high speed is not necessarily dangerous. In the case of a "super-saturation speed," even a speed, for example, of 5 km/h or 20 km/h, can be dangerous. Traveling at a super-saturation speed always constitutes a traffic offense. On an expressway, if the speed is a "non-saturation speed," there is no danger even at a speed of 90 km/h. Danger depends not so much on the absolute speed as on the non-saturation relative speed.

A "saturation speed" occurs, for example, at the stop position where the car stops at a red light. Alternatively, it may occur at the stop position where the car stops at a red blinking light. It also occurs at the time of stop/careful-advance at a yellow light, and at the time of careful advance at a yellow blinking light. It also occurs at the time of temporary stop at a designated place. It also occurs at the time of slow-moving/stop before a crosswalk. It also occurs at the time of slow-moving before a railroad crossing. It also occurs at the time of slow-moving at a where slow-moving is required. It also occurs at the time of slow-moving or stopping when giving way to an emergency vehicle. It also occurs at the time of saturated following/stop/slow-moving in a jammed or non-passing area. It also occurs at the time of deceleration, slow-moving, or stopping in order to conform to limited speed, regulation speed, and legal speed, and to conform to safe driving obligations and danger avoidance obligations. Apart from the above, it is a speed adopted in order to positively attain and maintain a "maximum saturation speed".

In the case, for example, at the traffic stop of a speeding driver, there is no "saturation speed" involved. Further, an exemption speed for a tractor with no traction device attached thereto does not belong to the category of "saturation speed". Further, an unattained speed of a special car incapable of fast traveling due to its structure, an insufficiently equipped car, an overloaded car or the like does not belong to the category of "saturation speed". Apart from this, a speed which does not allow the attaining and maintaining "maximum saturation speed" does not belong to the category of "saturation speed".

An "express car" is a car with an indication of "model driving". Generally speaking, from the viewpoint of road traffic, all cars are required to perform safe driving and to efficiently use the road. To satisfy both requirements, however, it is necessary to travel at the "saturation speed" of the road, i.e., the highest possible permissible speed. While slow traveling helps to enhance the safety of the car on the road, it results in marked deterioration in the efficiency with which the road is used. For a car driver wishing to arrive at his destination early, it is tedious to follow such a slow-moving car. On the other hand, when the forward car is an "express car" being driven at the "saturation speed," he can decide to follow that car without hesitation.

Assuming that cars of the same maximum speed (i.e., coordinate cars, which are, for example, ordinary passenger cars) are traveling straight on an ordinary driveway or an expressway, one following the other, which is a forward "express car" consisting of an ordinary passenger car. In this case, the "express car" is always traveling at the highest possible permissible speed, so that it is legally impossible for the following car to pass the forward "express car". Thus, the indication of "express car" means it is prohibited for the subsequent car to pass that car. In other words, the "express car" is not passed by the subsequent car. The subsequent car does not get ahead of the forward "express car". None of the two drivers experience any reluctance or resistance with respect to this state. They both recognize this state as rational from the viewpoint of traffic safety. If this recognition becomes universal, the car following the "express car" is itself not passed by a third car following it. Thus, the subsequent car perfectly keeps a proper distance between itself and the forward car. It is possible to prevent unnecessary passing or cutting-ahead, whereby useless changes in lane are eliminated. Thus, there is realized an orderly, safe row of cars. This would appear a forerunner of the ultimate dream of automatic traveling.

It is also possible for the car following the "express car" to travel while giving the indication of "express car." This car plays the same role as a car driven by a person engaged in traffic business. A car driven by a person engaged in traffic business leads the cars around, with the person utilizing his knowledge of the Road Traffic Laws. For example, it indicates to the subsequent car whether to increase or decrease speed and when to stop. It is possible for the driver of the foremost car of the row to convey his intention to the subsequent car through the indication of "express car". For example, he can instruct the subsequent car not to pass him but to rely on and follow him, thus conveying that there is no need for the subsequent car to pass him. It is also possible for the driver to give the indication of "model driving". The indication of "express car" can enable the driver of the subsequent car to rest assured that the forward car will always travel at the "saturation speed".

Figure 5:
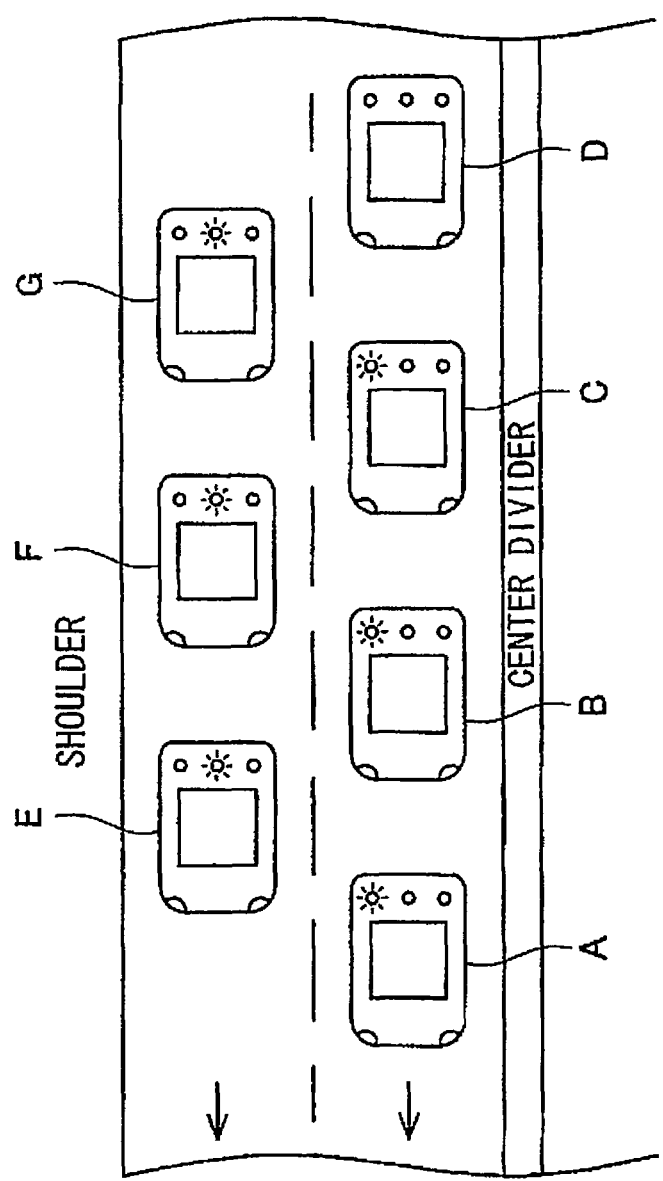
FIG. 5 is a plan view of a road and cars in a state where one of the cars, indicating an express mode, travels in a fast lane.

In FIG. 5, symbol A indicates an express car traveling foremost at a "saturation speed". Symbol B indicates an express car, which follows car A. Symbol C indicates an express car, which follows car B. Symbol D indicates a "high-ranking car," which is wishing to pass the group of express cars ahead. Symbols E, F, and G indicate "slow cars" or "low-ranking cars" traveling at an express speed.

The forward car of each express car is always traveling at the highest possible permissible speed, that is, the "saturation speed". Thus, there is no need for each express car to pass the forward car. For each express car to pass the forward car constitutes an illegal act. The driver of each express car understands from experience that he can travel fast and safely by following the forward car. Thus, it is possible to suppress unnecessary passing, unnecessary lane changes, dangerous cutting-ahead, etc. (the effects of an express car. See the second and third embodiments).

On an expressway, an express car is not passed by a coordinate express car, a low-ranking express car, a high-ranking slow car, or a semi-high-ranking slow car. A low-ranking express car consists of a freight car or the like the total car weight of which is not less than a predetermined value. The maximum speed permissible for a low-ranking express car differs from that permissible for a high-ranking express car and a semi-high-ranking express car. A low-ranking express car can only be passed by a high-ranking express car and a semi-high-ranking express car at a point in time during traveling at the "maximum saturation speed". There exists no car that passes a high-ranking express car and a semi-high-ranking express car. In FIG. 5, there exists no car passing a high-ranking express car except for a car guilty of a traffic violation. Thus, it is possible for a high-ranking express car to travel without being obstructed by anyone while maintaining a necessary and sufficient distance between itself and the forward car. This helps to reduce the possibility of a rear-end collision (fourth and fifth embodiments).

As shown in FIG. 5, a plurality of express cars A, B, and C are traveling ahead of car D whose indicator lamp is not illuminated. The plurality of express cars A, B, and C are traveling along a passing lane. When the number of lanes is two or less, the car D cannot pass express cars A, B, and C even if its driver wants to do so. There are cases where a car travels without being capable of making a lane change, with a plurality of express cars traveling ahead. The traveling of the car at this time is referred to as blocked traveling (first embodiment).

As shown in FIG. 5, a car may be unintentionally arranged at a block position where blocked traveling is required. Except when an emergency car approaches it, there is no need for a high-ranking express car to decelerate or make a lane change. A high-ranking express car, which travels at a saturation speed, need not give way to any car except for an emergency car. Giving way to a car lighting no indicator lamp means overlooking or aiding and abetting various offensive acts. Also from the viewpoint of eliminating a car traveling at an excessive speed, there is no need for a high-ranking express car to give way to any other car (sixth embodiment).

Only a special express car, which is a high-ranking express car, can always travel along a passing lane. A special express car is passed by no car except for an emergency car. Thus, a special express car can always travel along a passing lane, and can move fastest and safest in terms of the traffic laws. As a result, the driving of a special express car is rational, safe, easy, comfortable, and joyful. A special express car can block an excessive speeder. As a result, a special express car serves as a leader in terms of road traffic, making it possible to reduce high-speed travelers ignoring the traffic laws. A special express car has the privilege of traveling along a passing line, and has a mission to maintain a complete saturation speed. As a result, the mission of a special express car increases to a marked degree. In some cases, a special express car has the privilege of always traveling along the passing lane on every road. Such a car is referred to as a preferential car. A car lighting no indicator lamp, a slow car, a semi-high-ranking car, and a low-ranking car are obliged to effectively utilize limited lanes (tenth embodiment). The present device helps to promote the efficiency of traffic (ninth embodiment). The present device helps to promote the elimination of traffic accidents (eighth embodiment). The present device helps to promote the realization of a cooperative society for cars (seventh embodiment).

An express car can travel at a speed attained by adding an addition speed constant to a complete saturation speed. The addition speed constant is a privilege given to an express car as a compensation for its suppression of a car traveling at an excessively high speed. For example, on a road where the legal maximum speed exceeds 50 km/h, the addition speed constant is 10 km/h. On a road where the legal maximum speed is not more than 50 km/h, the addition speed constant is 5 km/h.

A slow car indicates "slow drive" or "safety drive". A slow car sometimes travels at a permissible limit speed. At other times, it travels at a speed lower than the permissible limit speed. A car in a hurry passes a slow car as appropriate. The driver of a slow car indicates his intention to the rearward car. As a result, it is possible for the driver of the slow car to drive safely at his own pace.

When the saturation speed is high, a slow car travels at a non-saturation speed. When the saturation speed is low, it travels at the saturation speed. A slow car sometimes travels at a non-saturation speed and other times at a saturation speed. This is referred to as a mixed speed. A slow car travels at a mixed speed.

A slow car may travel at a speed other than a non-saturation speed, for example, at a red light. It is tedious to switch the indication from "slow" to "express" each time. The indication "slow" means that traveling is effected at a mixed speed including a non-saturation speed and a saturation speed.

A Japanese expressway will be used as an example. The limit speed for a freight car is typically 80 km/h, and the limit speed for an ordinary passenger car or the like is 100 km/h. In this case, it may occur that an ordinary passenger car, which is an express car, may pass a freight car, which is a slow car. It should be noted, however, that a low-ranking express car can travel at 90 km/h, which is a speed attained through addition of an addition speed constant. The upper limit speed for a high-ranking express car and a semi-high-ranking express car is 110 km/h, and the upper limit speed for a low-ranking express car is 90 km/h. The upper limit speed for a high-ranking slow car, a semi-high-ranking slow car, and a low-ranking slow car is 80 km/h, and the upper limit speed for a car lighting no indicator lamp is 100 km/h. With the upper limit speed being dispersed, these cars travel in alignment. As a result, it is possible to avoid jamming of the road. Also on an ordinary road, an addition speed constant can be added to the upper limit speed of an express car.

A motionless car indicates "motionless" or "no following". In an urban area or the like, it can happen that a plurality of cars including a freight car, are standing in front of your car. In this case, if no indication is given by these cars, there is no telling whether the forward cars are going to move or not. In some cases, a car is not driven even with a driver inside. Thus, with just a look, it is impossible to correctly grasp whether they have an intention to drive or not. In this case, an "autonomous stop" car or a parking car indicates "motionless". A car going ahead indicates "express" or "slow". As a result, it is possible to reduce useless movement of the rearward car. Also, the driver of the rearward car is less confused.

Effects of the First Embodiment

Traveling at a "saturation speed" is effected by using an "intention indicator". This helps to obtain the following effects. These effects can be illustrated with reference to FIG. 5. (1) It is possible to rationally suppress excessively fast driving. (2) It is possible to reduce or eliminate useless passing. (3) Useless lane-change/cutting-ahead preferably becomes non-existent. (4) Cars are enabled to travel while keeping a sufficient distance between them. (5) It is possible to reduce or cut down on rear-end collisions due to insufficient inter-car distance. (6) It is possible to bring home the observance of the Road Traffic Laws through mutual understanding between cars. (7) (8) Traffic accidents are eliminated or reduced through cooperation between cars. As a result, it is possible to achieve a reduction in casualties or the like. (9) It is possible to efficiently police traffic violations by using, as a reference, a car having an indicator lamp which is not illuminated. (10) It is possible to cut down permanent traveling along passing lanes by imparting a privilege to special express cars.

Effect of the Second Embodiment

When a speed regulation is put into effect on an expressway due to snow, rain, or some other reason, it may occur that an express car travels without noticing this regulation. In this case, it is possible for the driver of the express car to notice this regulation from the speed of a coordinate express car or a high-ranking express forward car. This enables the car to travel at an intended safety speed.

Effect of the Third Embodiment

It is possible to give priority to pedestrians on a crossroad. When an express forward car decelerates and stops before a crossroad, it is normally to be assumed that there exists a pedestrian. A "heteronomous stop" state lasts until the pedestrian completes the crossing. As in the case of stop at a red light, this state is included in "saturation speed" traveling. Since the driver of the subsequent car can see the situation, it is possible to suppress irritation of the driver of this subsequent car. When an express car indicating "model driving" is placed in the above state, priority is given to pedestrians, and consciousness of law observance to protect the weak is enhanced to a marked degree.

Effect of the Fourth Embodiment

When, for example, a car is traveling while indicating "express," it can happen that the driver becomes aware of a traffic accident or a fire accident within a tunnel of an expressway or the like before reaching the tunnel. In this case, "heteronomous stop" is immediately effected obliquely to the right at the center of the road, and, all this while, the indication of "express" is continued. As a result, it is possible to convey the message of, "There is danger ahead; no passing allowed" clearly and quickly to the driver of the rearward car. By cutting off the traffic, it is possible to effectively avoid a secondary disaster that might be caused by another car entering the tunnel. An emergency blinker alone does not show that the car wants the rearward car to stop. Thus, the subsequent car might go ahead, unaware of the danger. It is better to use the present device along with the emergency braking lamp. On an ordinary road, it can happen often that cars are caused to stop in a long line due to falling rocks, a landslide, collapse of the road surface, or a severe snowstorm. In this case, it is possible to avoid damage by preventing the cars from getting to such dangerous spot.

Effect of the Fifth Embodiment

In the following example, a slow car indicates "slow". Examples of a slow car include a school bus, a cruising taxi, a patrol car, a heavy cargo car, a parade car, a welfare car, a propaganda truck, an animal carrier, a training car accompanying a marathon runner, an on-the-road training car for a person with a learner's license, and a car carrying an infant, an aged person, an invalid or the like. A slow car is driven, for example, by a beginner, an aged person, or a physically handicapped or a hearing impaired person. Through the indication of "slow," it can be recognized as a car intended for slow, safety driving. This helps to protect the weak without involving any hostility on the part of others. At night, the indication of "slow" by the "intention indicator" proves effective.

A slow car is, for example, a car driven under the principle of slow/safety driving (a car declaring safety drive). A slow car is, for example, a safety-drive car. In this car society, which is full of danger, the drivers of safety-drive cars have a fear of accidents. Alternatively, they are people who have given up driving for a long time against their own will or who have reduced their driving frequency. There are cases where people wish to adopt a slow and easy manner of driving instead of always traveling at high speed in a high-class car, such as a sport car. In such cases, it is possible to give an indication of their intention to the subsequent car; then, the driver of the subsequent car can make sure of the intention of the forward car without feeling any disappointment. This helps to adopt a variety of driving operations, which may not be in conformity with the grade of the car, thus making it possible to clear away a fixed idea regarding the car type.

Effect of the Sixth Embodiment

An example of a motionless car indicating "motionless" will be described below. A motionless car is, for example, a car in the state of "autonomous stop" or parking. In principle, there is no need to turn on the present device while the car is parking at a legally acceptable place.

Effect of the Seventh Embodiment

A motionless car is a car in and from which loading and unloading of delivery-service goods or the like is being performed. Such loading and unloading may be performed, for example, on an ordinary road, where there is a fear of hindering smooth traffic.

Effect of the Eighth Embodiment

In the following cases, smooth traffic is promoted. "Motionless" is indicated while people such as the passengers of a taxi, a pick-up bus or some other ordinary car are getting on and off the car. "Motionless" is indicated by a bus under schedule adjustment or waiting for the start time, and by a car driver using a mobile phone. "Motionless" is indicated so that an emergency blinking indicator lamp may not be used for purposes other than its proper purpose. The present device can be used as a substitute for an emergency blinking indicator lamp.

Usually, the driving of a car requires the use of lamps corresponding to the following eight functions: 1. Traveling; 2. Turning to the left and right; 3. Changing lanes; 4. Stopping; 5. Moving backward; 6. Emergency; 7. Parking; and 8. Nocturnal driving. At the time of turning to the left and right, a direction indicator exerts its function. Also at the time of changing lanes, the direction indicator functions. At the time of stopping, a braking lamp functions. At the time of moving backward, a backward-move lamp functions. At the time of emergency, an emergency blinker functions. At the time of parking, a parking lamp functions. This differs in role from the indication of "motionless" by the present device. During nocturnal driving, a tail lamp or car-width lamp functions.

The present device exerts its function at the time of traveling. The driving of a car mostly consists of the act of traveling. The present device is an indication indicator. In fact, up to now, there has been not introduced "indication indicator device" for use during the straightforward advancement of a car. The functions of the intention indicator include the indication of "express", the indication of "slow," and the indication of "motionless". The three modes of indication by the intention indicator are inseparable from each other; they are preferably included together in an embodiment.

The present device is far more advanced than the conventional lamps for the seven functions in terms of novelty and inventive step. The present device is capable of performing a high-degree intention indication, which has been lacking in the related art. The present device allows the selective indication of a plurality of driving intentions.

The present indication device is an indispensable item no less important than the direction indicator. Up to today, the present invention has not been conceived of while everybody has been aware of the necessity of a device helping to convey intention during straight driving. It is to be expected that the present-day traffic society will be dramatically reformed thanks to the system of saturation speed, non-saturation speed, super-saturation speed, etc. The day will surely come when it will be thought no smooth driving is impossible without the present device. If so, driving without indication by the present device might even constitute a violation of Road Traffic Laws. The driving intention indicator will be able to realize a revolutionary change in the present-day driving environment for cars.

A first system of the installation standard for the driving intention indicator will be described below. The rear surface of a car to be equipped with indicator lamps is equally divided in the width direction into eight portions. The eight portions each constituting a ⅛ area of the rear surface are numbered as 1 to 8 from the right to the left as seen from the car behind. The portion occupying areas 1 and 2 will be referred to as "right". This portion provides an "express" indicator lamp installation frame. The portion occupying areas 4 and 5 will be referred to as "middle". This portion provides a "slow" indicator lamp installation frame. The portion occupying areas 7 and 8 will be referred to as "left". This portion provides a "motionless" indicator lamp installation frame. Areas 3 and 6 are not used.

In the case of a motorcycle, the number of indicator lamps in each area is preferably one. In the case of a car, the number of indictor lamps in each area is preferably one or two. The total number of indicator lamps is preferably three or six. There are, however, no limitations regarding the number of light sources in each lamp.

The indicator lamps in the "right" and "left" portions are symmetrically situated with respect to the center line of the car. This also applies to the case where the number of middle indicator lamps is two. In some cases, the number of indicator lamps in each portion is one. In this case, it is only necessary for the "slow" indicator lamp in the "middle" portion to be within the frame of areas 4 and 5. It may not be at the center in the width direction.

The upper edges of the indicator lamps are not higher than ⅗ of the car height. As for their brightness, etc., the standard for other car lamps is applicable. The lights of the indicator lamps are all of the same color. For example, a predetermined green-type color is adopted. It is possible for the indicator lamps to blink for an appropriate minute period of time. For example, such blinking is effected immediately after indication or immediately after the operation of switching from one indication to another. This helps to call the attention of the driver of the rearward car or the like. In some cases, the selection switch 46 is operated during the blinking of the direction indicator. In this case, it is desirable not to effect, or to interrupt, the blinking immediately after the switching operation on the indicator lamps.

The present device has an illuminance sensor for detecting brightness on the outside. The illuminance of the indicator lamps is adjusted by the illuminance sensor. This helps to automatically adjust the illuminance of the indicator lamps in the daytime and at night. When the indicator lamps are to be used along with emergency braking indicator lamps, it is desirable to make such setting that the indicator lamps emit lights of approximately the same degree of illuminance during the daytime. The present device may have a voice guidance device. The voice guidance device, which is operated by the selection switch 46, emits sound or voice guidance corresponding to the indication. This enables the operator to recognize the indication state.

A second system of the installation standard for the driving intention indicator will be described below. The second system differs from the first system in the following point. In the second system, for example, the indicator lamps emit lights of different colors. Thus, the present device has indicator lamps of three colors. The "express" indicator lamp emits light of one definite green-type color. For example, it is the same color as that adopted in the first system. The "slow" indicator lamp emits light of one definite orange or yellow type color. The "motionless" indicator lamp emits light of one definite violet or indigo type color.

In no case, the first and second systems are simultaneously adopted in the same region.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the attached claims. For example, embodiments of the present invention should not be limited to the representative configurations, but may be modified.

The invention claimed is:
1. A driving intention indictor device for a car comprising:
a right indicator lamp provided on a right side in a width direction of a car body so as to be able to be visually recognized by a driver of a rearward car;
a middle indicator lamp provided at a central position in the width direction of the car body so as to be able to be visually recognized by the driver of the rearward car;

a left indicator lamp provided on a left side in the width direction of the car body so as to be able to be visually recognized by the driver of the rearward car; and a switch configured so that a position of the switch is selected by a driver in correspondence with switching between an express state in which the car always travels at a "saturation speed", a slow state in which the car travels at "mixed speed", and a motionless state in which the car is in a "motionless", and wherein the driving intention indictor device is configured so that while the express state is selected by the switch, the right indicator lamp is illuminated, while the slow state is selected by the switch, the middle indicator lamp is illuminated, and while the motionless state is selected by the switch, the left indicator lamp is illuminated.

2. The driving intention indictor device of claim 1, wherein the right indicator lamp, the middle indicator lamp, and the left indicator lamp emit light of the same color.

3. The driving intention indictor device of claim 1, wherein the right indicator lamp, the middle indicator lamp, and the left indicator lamp emit lights of different colors.

4. The driving intention indictor device of claim 1, wherein each of the right indicator lamp, the middle indicator lamp, and the left indicator lamp have one or a plurality of light-emitting lamps.

5. A driving intention indictor device for a car comprising:

a right indicator lamp provided on a right side in a width direction of a car body so as to be able to be visually recognized by a driver of a rearward car;

a middle indicator lamp provided at a central position in the width direction of the car body so as to be able to be visually recognized by the driver of the rearward car;

a left indicator lamp provided on a left side in the width direction of the car body so as to be able to be visually recognized by the driver of the rearward car; and a switch configured so that a position of the switch is selected by a driver in correspondence with switching between an express state in which the car always travels at a "saturation speed", a slow state in which the car travels at "mixed speed", and a motionless state in which the car is in a "motionless", and wherein the driving intention indictor device is configured so that while the express state is selected by the switch, the left indicator lamp is illuminated, while the slow state is selected by the switch, the middle indicator lamp is illuminated, and while the motionless state is selected by the switch, the right indicator lamp is illuminated.

6. The driving intention indictor device of claim 5, wherein the right indicator lamp, the middle indicator lamp, and the left indicator lamp emit light of the same color.

7. The driving intention indictor device of claim 5, wherein the right indicator lamp, the middle indicator lamp, and the left indicator lamp emit lights of different colors.

8. The driving intention indictor device of claim 5, wherein each of the right indicator lamp, the middle indicator lamp, and the left indicator lamp has one or a plurality of light-emitting lamps.

* * * * *